United States Patent [19]
Powell

[11] Patent Number: 5,795,551
[45] Date of Patent: Aug. 18, 1998

[54] FLOATING CHEMICAL DISPENSER WITH DELAY FOR SWIMMING POOLS

[76] Inventor: Jonathan S. Powell, 5094 Tip Top Rd., Mariposa, Calif. 95338

[21] Appl. No.: 682,998

[22] Filed: Aug. 18, 1996

[51] Int. Cl.⁶ .................. B01D 11/02; C02F 1/76
[52] U.S. Cl. .............. 422/264; 422/265; 137/268; 210/198.1; 210/754; 222/477
[58] Field of Search ............... 422/264, 264 B, 422/265; 137/268; 210/169, 198.1, 754; 4/223, 225.1, 226.1, 227.1, 229, 230; 222/476, 477; 221/15

[56] References Cited

U.S. PATENT DOCUMENTS

| | | | |
|---|---|---|---|
| 3,107,156 | 10/1963 | Fredericks | 422/264 B |
| 3,483,989 | 12/1969 | Gopstein | 422/266 X |
| 3,598,536 | 8/1971 | Christensen | 422/264 |
| 4,350,666 | 9/1982 | Klutts | 422/264 X |
| 4,630,634 | 12/1986 | Sasaki et al. | 422/265 X |
| 4,663,057 | 5/1987 | Powell | 210/754 |
| 4,673,513 | 6/1987 | Powell | 210/756 |
| 4,876,003 | 10/1989 | Casberg | 422/264 X |
| 5,055,183 | 10/1991 | Buchan | 422/28 X |
| 5,389,345 | 2/1995 | Renton | 422/265 X |

Primary Examiner—Robert J. Warden
Assistant Examiner—E. Leigh McKane
Attorney, Agent, or Firm—Christie, Parker & Hale, LLP

[57] ABSTRACT

A chemical controller device for delaying the distribution of chlorinating chemicals into a swimming pool is disclosed. The chemical controller includes a floating dispenser with an inlet port and an outlet port. The floating dispenser contains the swimming pool chlorinating chemicals. A plug of a suitable chemical which dissolves in the pool water sealably blocks the outlet port and prevent contact between the chlorinating chemicals and the pool water. The chemical plug dissolves in the pool water over a period of time and then starts the chlorination process. The length of the chemical plug determines the number of days before the plug dissolves and thus when chlorination of the pool will commence.

20 Claims, 2 Drawing Sheets

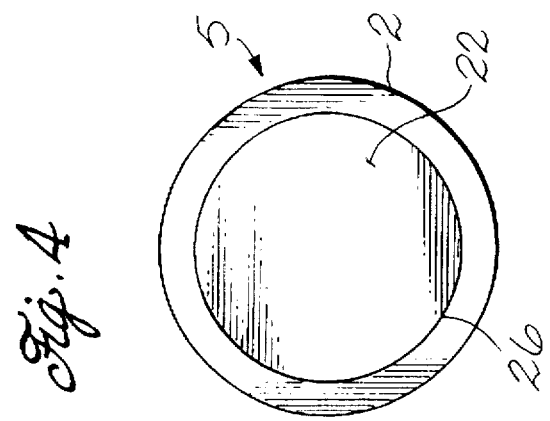
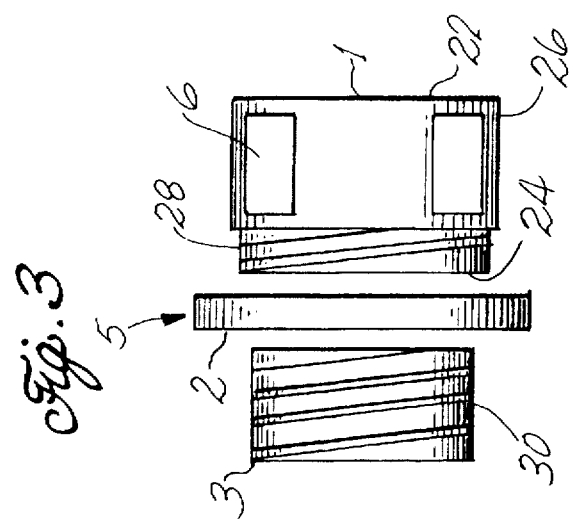
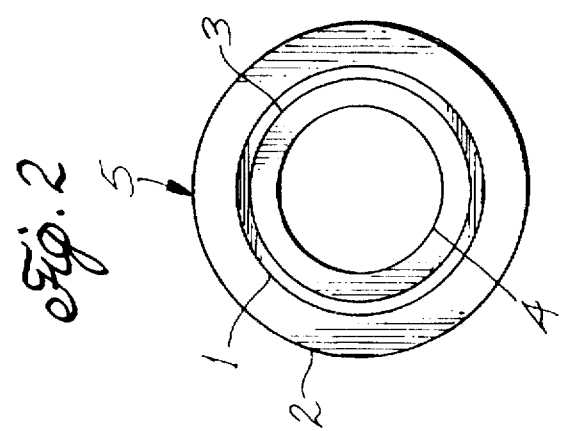

5,795,551

FLOATING CHEMICAL DISPENSER WITH DELAY FOR SWIMMING POOLS

FIELD OF THE INVENTION

This invention relates to floating dispensers for use in swimming pools. More particularly, this invention relates to floating dispensers into which a chemical compound is placed and which permits pool water to enter into the dispenser and dissolve some of the chemical compound to chlorinate the pool.

BACKGROUND OF THE INVENTION

A common method of service companies to chlorinate residential swimming pools is to periodically inject chlorine gas into the pool water from a small portable cylinder. Cyanuric acid, which previously has been dissolved in the water, combines with the chlorine which retards its degradation by sunlight and allows the release of free chlorine as needed to sanitize the water. In the summertime, in hot and sunny climates, an adequate concentration of chlorine will remain in the water for up to a week and in other seasons of the year from up to two to three weeks.

Because the summertime is the only period a pool needs to be visited once a week, it requires double the number of service men and trucks at this time. The extra temporary service men are laid off after the summer and the trucks are put in storage. This is a very undesirable requirement because of the cost of the extra trucks and the difficulty of obtaining and training temporary summertime employees. My invention is designed to eliminate this problem.

Several devices have been developed in an attempt to automatically treat and chlorinate pool water. However, none, of these devices adequately overcomes the aforementioned problems. For example, U.S. Pat. No. 3,598,536 issued Aug. 10, 1971 to J. Christensen relates to a chemical feeder for dispensing relatively small pellets into a swimming pool.

U.S. Pat. No. 3,483,989 issued Dec. 16, 1969 to H. Gopstein relates to a buoyant block pierced with holes to accommodate chlorine pills. The bottoms of the holes are stopped to permit water to come up into the holes and slowly dissolve the lowest layer of pills.

U.S. Pat. No. 4,663,057 issued May 5, 1987 to Jonathan S. Powell, Jr. relates to a swimming pool chlorine injection means and method.

U.S. Pat. No. 4,630,634 issued Dec. 23, 1986 to Susaki et al relates to a chlorine dispenser for a spa, hot tub or swimming pool in which a floating device with adjustable closing slots determines how much of the source material will be below the trapped air bubble in the body.

U.S. Pat. No. 5,055,183 issued Oct. 8, 1991 to Leon Buchan relates to a water treatment device which supports a rapidly dissolving water treatment substance.

U.S. Pat. No. 4,673,513 issued Jun. 16, 1987 to Jonathan S. Powell relates to a process for chlorination of swimming pools for treating the water with automatic equipment from a group of selected chemicals.

SUMMARY OF THE INVENTION

The object of this invention is to provide a chemical controller connected to a floating dispenser in which a chlorinating chemical compound such as tablets of trichlorisocyanurate (Trichlor) or other suitable chemical are placed. The chemical controller permits some pool water to pass through an outlet port in the dispenser and dissolve some of the Trichlor to chlorinate the pool water. The outlet port is blocked by a watertight solid cylindrical plug which dissolves in the pool water in a selected number of days, to allow the passage of pool water over the tablets and start the chlorination process.

The chemical controller comprises an adaptor having a plurality of channels for the passage of the Trichlor chemical solution into the pool. The chemical controller is connected to a floating dispenser and also includes, a connector attached to the adaptor and an outlet port filled with a cylindrical plug of a dissolvable sodium isocyanurate or other suitable chemical. The chemical controller permits the flow of pool water at a regulated rate out of the outlet port of the dispenser to which the cylindrical plug is attached. In use as a chemical controller for swimming pools, the floating dispenser has a chlorinating chemical such as tablets of trichloroisocyanurate (Trichlor) to chlorinate the pool water. The length of the cylindrical plug of sodium isocyanurate or other suitable chemical determines the number of days to delay the pool water to flow over the trichloroisocyanurate (Trichlor) tablets to begin the chlorination process.

A cylindrical plug of sodium isocyanurate is selected because it dissolves at a desirable rate and is the form at which cyanuric acid exists in pool water.

This invention provides for an outlet port having a cylindrical plug of sodium isocyanurate or other suitable chemical which dissolves in approximately six to seven days to start Trichlor chlorination.

By providing a floating dispenser holding a chlorinating chemical which is blocked from exposure to the pool water by a dissolvable plug, the present invention reduces the need for rechlorination servicing. In a typical operation, a service person chlorinates the pool with a chlorine gas and then places a floating dispenser having the chemical controller of the present invention into the pool. The floating dispenser retains an adequate number of Trichlor tablets to chlorinate the pool for a second week. Alternatively, a series of the floating dispensers may be joined together by a fastening means. Each of the floating dispensers has a chemical controller with an outlet port having a different length of a dissolvable cylindrical plug. Differing the length of the dissolvable plugs determines the amount of the delay to start dispensing chemicals into the pool water.

BRIEF DESCRIPTION OF THE DRAWINGS

FIG. 2 is a top view of the chemical controller of FIG. 1.

FIG. 3 is an exploded view of the chemical controller of FIG. 1.

FIG. 4 is a bottom view thereof of the chemical controller of FIG. 1.

DETAILED DESCRIPTION OF THE PREFERRED EMBODIMENTS

Figure 1:
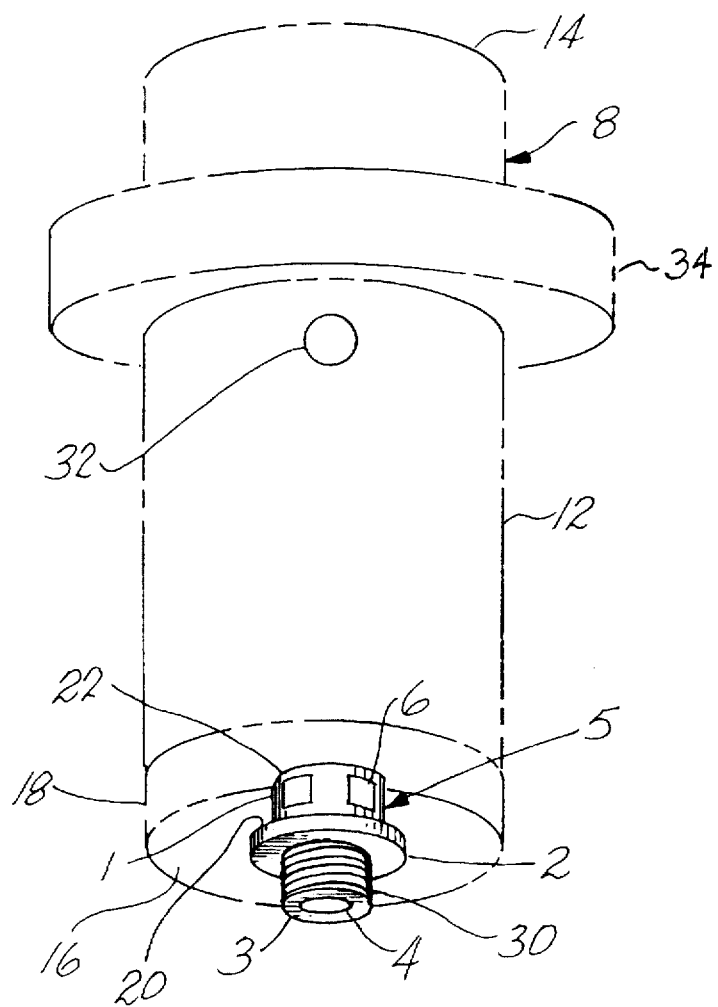
FIG. 1 is a perspective view of a floating dispenser with a chemical controller according to the principles of the present invention.

Referring now to the drawings wherein like reference numerals designate identical or corresponding parts throughout the several views, an exemplary embodiment of a chemical controller device is illustrated in FIGS. 1 and 2 and designated by reference numeral 5. As shown, the chemical controller 5 includes an adapter 1 connected to a floating dispenser 8 for use in a swimming pool (not shown).

The floating dispenser 8 includes a container 12 extending between a top side or top end 14 and a bottom end 16. A water tight cover or lid 18 is connected to the bottom end 16. The lid 18 has a central opening 20 for sealable passage of the adapter 1.

The adapter 1 extends between a closed end 22 and an open end 24. A plurality of channels or openings 6 are disposed in the adapter 1 adjacent the closed end 22. The plurality of channels 6 are each fluidly connected to the open end 24 and provide fluid communication between the floating dispenser 8 and the pool water in which the dispenser is floating. The channels 6 are evenly spaced around the outer diameter 26 of the adapter 1 and permit the passage of pool water into and out of the floating dispenser 8 at a regulated rate. A connector 2 is used to sealably fasten the adapter 1 to the lid 18 of the floating dispenser 8.

A cylindrical outlet port 3 is connected to the open end 24 of the adapter 1. The outlet port 3 is sealably filled with a cylindrical plug 4 of sodium isocyanurate or other suitable chemical. The chemical plug 4 prevents the passage of pool water through the outlet port 3 and delays the start day for the release or dispensing of chemicals from the floating dispenser 8 to start the chlorination process of the swimming pool.

More specifically, the chemical plug 4 has a length substantially similar to the length of the outlet port 3. The chemical plug 4 dissolves in a preset period of time after the floating dispenser 8 and the attached chemical controller 5 is placed into contact with the pool water. Altering the length of the outlet port 3 and the chemical plug 4 alters the length of time before the chemical plug will dissolve.

In use, a chlorinating chemical, such as tablets of trichloroisocyanurate (Trichlor) are placed within the container 12 of the floating dispenser 8 to dissolve and chlorinate the pool water. The chemical controller 5 includes the outlet port 3 which is blocked by the inserted chemical plug 4 of sodium isocyanurate or other similar soluble chemical. The chemical plug 4 substantially dissolves in the pool water in a selected number of days and allows passage of the pool water over the chlorine tablets and through the outlet port 3 to start the chlorinating process.

The openings or channels 6 in the adapter 1 are located near the closed end 22. This portion of the adapter 1, i.e., the closed end 22 and the channels 6, are disposed within the inner side of the lid 18 and have an outer diameter greater than the diameter of the opening 20 in the lid. This configuration prevents the adapter 1 from passing through the opening 20 in the lid. The configuration also allows the open end 24 of the adapter 1 to extend through the opening 20 in the lid 18. The connector 2 is threadably connected to the open end 24 to sealably capture the lid 18 between the enlarged diameter portion of the adapter 1 within the container 12 and the connector. The open end 24 is also connected to the outlet port 3 to provide a water tight fit.

The channels 6 provide free flow of pool water in and out of the floating dispenser 8 for chlorinating the pool water. The channels 6 are oriented substantially perpendicular to the closed end 22 to keep the chlorine or Trichlor tablets from clogging the outlet port 3, as best illustrated in FIG. 3.

The longer length of the outlet port 3 containing a longer cylindrical plug 4 of sodium isocyanurate or other suitable chemical extends the days to delay the start Qf chlorination of the pool water.

As illustrated in FIG. 1, the open end 24 of the adapter 1 passes through the center opening 20 in the lid 18. The open end 24 includes external threads 28 which are exposed on the outside of the lid 18. The connector 2 includes internal threads (not shown) which are threadably connectable with the external threads 28 on the open end 24 to form a water-tight fit with the lid 18. The open end 24 also includes internal threads (not shown) for threadably coupling with a portion of external threads 30 along the cylindrical outlet port 3.

Pool water enters an inlet port 32 which is located on the upper top end 14 of the floating dispenser 8 and the contained Trichlor dissolves causing an increase in the water density. This more dense water solution flows out the outlet port 3 to cause circulation of water into the inlet part 32 and out of outlet part 3 of the floating 8 dispenser carrying dissolved Trichlor.

The rate of chlorination is a function of the temperature of the water, the surface area of the Trichlor tablets in contact with the pool water entering the floating dispenser 8 and the sizes of the inlet port 32 and the outlet port 3.

The higher the water temperature the greater is the solution rate of the Trichlor and thus the chlorination rate. This is desirable because the warmer the pool water, the greater is the need for chlorine.

The larger the surface area of the Trichlor in contact with the water passing through the floating dispenser 8, the greater the rate of chlorination. The surface area of the Trichlor may be a maximum at the start of chlorination and decrease if the column of Trichlor tablets exposed to entering pool water decreases during the chlorination period. Therefore, more tablets should drop into position to make up for the reduction in column height. Trichlor is normally supplied in 1-inch and 3-inch diameter tables. For an average size pool of 20,000 gallons of water the 3-inch tablets are satisfactory. However, for larger pools it may be necessary to use the 1-inch tablets for more surface area.

Some control of the chlorination rate may be obtained by the sizing of the inlet port 32 with the outlet port 3 being of a fixed size larger than the largest opening 6 that may be used and of an adequate diameter for the dissolvable cylindrical plug 4 of sodium isocyanurate.

In an alternative embodiment, a plurality of floating dispensers 8 are joined together by a fastening means. Each of the floating dispensers 8 is configured to accept different lengths of cylindrical plugs 4. The multiple floating dispensers 8 allows a staggered selected number of days to delay the beginning of the chlorination process of the pool water.

A float member 34 having a larger diameter than the floating dispenser 8 is attached to the top end 14 the container 12. The float member 34 is a ballast structure for the floating dispenser 8 and may be hollow and filled with a foam, such as a closed cell foam material. The float member 34 and the floating dispenser 8 with the attached adapter 1 are cooperatively defined to keep the floating dispenser 8 erect and upright in the pool water and the cylindrical plug 4 down irrespective of the quantity of the contents in the container 12.

Preferably, the chemical controller 5 has an outlet port 3 and the container 12 has an inlet port 32 sized to regulate the desired rate of flow. In use, the floating dispenser 8 holds a chlorinating chemical such as tablets of trichloroisocyanurate (Trichlor) to chlorinate the pool water. The outlet port 3 of the chemical controllers 5 is blocked by a cylindrical plug 4 of sodium isocyanurate or other suitable chemical which dissolves in the pool water and starts the chlorinating process. The length of the cylindrical plug 4 determines the number of days (delay period) of exposure to pool water required for it to dissolve.

As an example, the operation and performance of a typical floating dispenser 8 will be described. This example was performed during the month of July with daytime temperatures between 90 and 95 degrees F. The pool water temperature was between 77 and 81 degrees F. The pool was a 20,000 gallons in ground fiberglass pool.

The floating dispenser 8 included a 0.1 inch diameter inlet port 32 and an 0.5 inch diameter outlet port 3. The inlet port 32 was 2.5 inches above the outlet port 3. The dissolvable chemical plug 4 had a 0.5 inch diameter and a length of ⅞ inches. The chlorinating chemical within the container 12 included 3 tablets of Trichlor. Each tablet of the Trichlor had a 3 inch diameter and weighed 200g. This provided a total of 600 g. of Trichlor.

Before the chemical plug 4 in the outlet port 3 dissolved, an average of approximately 10g of Trichlor per day was released through the inlet port 32 and into the pool water. The soluble chemical plug sealing the outlet port 3 dissolved in 6 days. The average dissolve rate of the chemical plug 4 was approximately 0.0365 inches in length per day. After the chemical plug 4 in the outlet port 3 dissolved, an average of approximately 75g. of Trichlor was released into the pool water each day for another seven days.

As a second example, in November, with a pool water temperature of 70 degrees F. and the outlet port 3 plugged, 3g. of Trichlor per day was released through the inlet port 32 and the chemical plug 4 dissolved at a rate of 0.0365 inches per day.

It will be understood that various modifications can be made to the disclosed embodiments without departing from the spirit and scope thereof. Therefore, the above description should not be construed as limiting the invention, but merely as an exemplification of preferred embodiments thereof. Those of skill in the art will envision other modifications within the scope and spirit of the present invention as defined by the appended claims.

I claim:

1. A chemical controller for connection with a container of a dissolvable chlorinating chemical and for delaying for a preset period of time, passage of the dissolvable chemical into a swimming pool, the chemical controller comprising:

a tubular adapter extending between a closed end and an open end and including a plurality of open channels adjacent the closed end and in fluid connection with the open end, the closed end and the plurality of channels being configured for placement within the container and the open end being configured to pass through an opening in the container;

an outlet port adapted for connection with the open end of the tubular adapter; and a plug made from a soluble chemical, the plug being sealably supported within the outlet port;

wherein the chemical plug is substantially dissolvable by the pool water over the preset period of time to delay passage of water therethrough and the dispensing of the dissolvable chlorinating chemical within the container into the pool water.

2. The chemical controller as recited in claim 1, and further comprising a connector for sealably connecting the tubular adapter to the container.

3. The chemical controller as recited in claim 2 wherein a portion of the open end comprises external threads and the connector comprises internal threads for connection with the external threads on the open end.

4. The chemical controller as recited in claim 3 wherein the plurality of open channels are disposed substantially perpendicular to the closed end.

5. The chemical controller as recited in claim 4 wherein the outlet port and the chemical plug each have a substantially equivalent length and wherein the length determines the preset period of time in which the chemical plug substantially dissolves in the pool water.

6. The floating chemical dispenser for delayed dispensing of a dissolvable chlorinating chemical into a pool, the chemical dispenser comprising:

a container extending between a top end and a bottom end and having an inlet port disposed therebetween, the container configured for holding the chlorinating chemical;

a lid sealably coupled to the bottom end of the container, the lid having a central opening in communication with the container;

a float member attached to the container for maintaining the container in a floating and upright position in the pool such that the lid is maintained submerged;

a tubular adapter extending between a closed end and an open end and including a plurality of openings adjacent the closed end and in fluid connection with the open end, the closed end and plurality of openings being disposed within the container and the open end extending through the central opening in the lid and out of the container; and a connecter for coupling with the open end and sealably connecting the tubular adapter to the lid;

an outlet port adapted for connection with the open end of the tubular adapter;

wherein a cylindrical plug of a soluble chemical is sealably insertble into the outlet port, the chemical plug dissolvable by the pool water over a preset period of time to delay passage of water through the outlet port and the dispensing of the chlorinating chemical from the container into the pool.

7. The floating chemical dispenser as recited in claim 6 wherein the cylindrical plug and the outlet port comprise substantially similar diameters.

8. The floating chemical dispenser as recited in claim 7 wherein the chemical plug comprises sodium isocyanurate.

9. The floating chemical dispenser as recited in claim 8 wherein the inlet port is disposed between the float member and the bottom end of the container.

10. The floating chemical dispenser as recited in claim 6 wherein the outlet port supports a length of the cylindrical plug and wherein the length determines the preset period of time necessary to dissolve the chemical plug and commence dispensing of the soluble chlorinating chemical into the pool.

11. The floating chemical dispenser as recited in claim 6 wherein the open end comprises external threads adapted for threadable connection with the connector such that the lid is sealably captured between the closed end and the connecter.

12. The floating chemical dispenser as recited in claim 11 wherein the outlet port is threadably connected into the open end of the tubular adapter.

13. The floating chemical dispenser as recited in claim 11 wherein a portion of the tubular adapter, including the closed end and the plurality of openings, comprises an outer diameter greater than the diameter of the central opening in the lid.

14. The floating chemical dispenser as recited in claim 13 wherein the lid is removably connected to the container.

15. A floating chemical dispenser for delayed dispensing of a soluble chlorinating chemical in a swimming pool, the floating chemical dispenser comprising:

a container extending between a top end and a bottom end and having an inlet port disposed therebetween, the container configured for holding the dissolvable chlorinating chemical;

a lid sealably and removably coupled to the bottom end of the container, the lid having a central opening in communication with the container;

a float member attached to the container for maintaining the container in a floating and upright position such that the lid is submerged within the pool;

a tubular adapter extending between a closed end and an open end and including a plurality of openings adjacent the closed end and fluidly connected with the open end, the closed end and the plurality of openings being disposed within the container and the open end extending through the central opening in the lid and out of the container;

a connecter for coupling with the open end and sealably connecting the tubular adapter to the lid;

an outlet port adapted for connection within the open end of the tubular adapter; and a cylindrical plug of a soluble chemical sealably supported within the outlet port and blocking passage of pool water through the outlet port;

wherein the chemical plug is dissolvable by the pool water over a preset period of time to delay passage of the water through the outlet port and the dispensing of the soluble chlorinating chemical from within the container into the pool.

16. The floating chemical dispenser as recited in claim 15 wherein the inlet port comprises a diameter of approximately 0.1 inches and the outlet port comprises a diameter of approximately 0.5 inches.

17. The floating chemical dispenser as recited in claim 16 wherein the inlet port is disposed between the float member and the bottom of the container.

18. The floating chemical dispenser as recited in claim 17 wherein the closed end comprises a larger outer diameter than the central opening in the lid such that the lid is sealably captured between the closed end and the connector.

19. The floating chemical dispenser as recited in claim 18 wherein the chemical plug comprises a cylindrical plug of sodium isocyanurate.

20. The floating chemical dispenser as recited in claim 19 wherein the soluble chlorinating chemical comprises tablets of Trichloroisocyanurate.

* * * * *